United States Patent Office 2,815,259
Patented Dec. 3, 1957

2,815,259

PROCESS OF PREPARING ICE-COLORS IN TEXTILE PRINTING AND DYEING

Eugen Glietenberg, Leverkusen-Bayerwerk, and Josef Hassmann, Leverkusen-Schlebusch, Germany, assignors to Farbenfabriken Bayer Aktiengesellschaft, Leverkusen, Germany, a corporation of Germany No Drawing. Application October 7, 1952, Serial No. 313,583

Claims priority, application Germany December 17, 1951

2 Claims. (Cl. 8—45)

The present invention relates to a process of preparing ice-colors in textile printing and dyeing.

In textile printing it is known to use caustic alkaline solutions of ice-color coupling components together with alkali salts of such diazoamino compounds as contain acid salt-forming groups in the radical (stabilizer) not taking part in the formation of the dyestuff. These solutions, after adding thickening agents or other additions, if desired, are applied to the fiber by printing or slop-padding. By a treatment of the fibers thus prepared with dilute acid or acid containing steam the dyestuff is developed. Further, neutral developing processes have become known which avoid certain disadvantages involved in the after-treatment with acids. In this case, when the development of the dyestuff is achieved by means of neutral steam, fixed alkalies must be replaced by volatile bases or by oxygen-containing nitrogenous bases sufficiently volatile with steam.

In our copending application Serial No. 313,582, now Patent No. 2,758,001, a further process for the manufacture of ice-colors in textile printing or dyeing is described in which process the development of the dyestuffs is likewise effected by neutral steaming. According to that process printing pastes or slop-padding solutions are employed containing neutral fixed alkali salts of diazoamino compounds of the kind described in French specification No. 875,276, together with fixed alkali salts of ice-color coupling components. The diazoamino compounds according to French specification No. 875,276 correspond to the general formula:

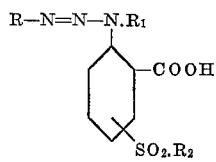

wherein R stands for aryl, $R_1$ for hydrogen, alkyl or substituted alkyl, and $R_2$ for the radical of an aminoalkyl sulfonic or carboxylic acid or an alkyl radical containing solubilizing groups. After printing or slop-padding on the fiber, the dyestuff is developed by steaming with neutral steam. There are, however, certain difficulties in preparing by that process other shades, in particular blue, green and violet shades, since the bases characteristically used as diazo components for the formation of such shades show such a low coupling energy that they are not able to form the stabilized diazoamino compounds—necessary for accomplishing the process—with the comparatively weakly basic stabilizers which are used in that process. Such bases, however, form stable diazoamino compounds with other suitable stabilizers, especially with such stabilizers of the aliphatic, hydroaromatic, heterocyclic or aromatic series as are secondary bases, containing in the case of heterocyclic stabilizers an =NH group in cyclic linkage, and have solubilizing groups. Stabilizers of this kind are, for example, sarcosine, methyl taurine, cyclohexylamino acetic acid, pyrrolidine carboxylic acid (proline), and similar compounds.

According to the present invention, further ice-color shades, in particular blue, green and violet shades, are prepared by simply steaming with neutral steam, by the employment of printing pastes or slop-padding solutions containing the neutral fixed alkali salts of diazoamino compounds of the kind just described, i. e. especially those formed from bases appropriate for the production of blue, green and violet shades and stabilizers of the aliphatic, heterocyclic or aromatic series which are secondary bases and which have solubilizing groups, and fixed alkali salts of ice-color coupling components. Bases known to produce shades towards the blue side of the spectrum are particularly those bases containing alkoxy groups as substituents and may contain as further substituents acylamino groups or nitro groups. As examples may be mentioned 1-amino-2,5-dimethoxy-4-benzoylaminobenzene, 1-amino-2,5-diethoxy-4-benzoylamino-benzene, 1-amino-2-methoxy-5-methyl-4-benzoylamino-benzene, 4-amino-4'-methoxy-diphenylamine, 4,4'-diamino-3,3'-dimethoxydiphenyl, 1-amino-2-methoxy-5-nitro-benzene or 1-amino-2-methoxybenzene-5-sulfodiethylamide. In this process either the separately prepared alkali salts of the ice-color coupling components can be used or the ice-color coupling components can be dissolved in fixed alkalies in the preparation of the printing pastes or the slop-padding solutions, the quantity of alkali employed corresponding to about 40 to 120 percent of the quantity theoretically necessary for the formation of the alkali salts. The printing pastes and slop-padding solutions are prepared with the usual solvents and thickening agents.

The process according to the present invention is of great practical importance because it is possible by means of it to supplement the process according to our copending application Serial No. 313,582 in a way which is entirely satisfactory for practical purposes, particularly towards the blue, green and violet range.

The following examples illustrate the invention without, however, limiting it thereto:

Example 1

1 mol of diazotized 1-amino-4-benzoylamino-2,5-diethoxy-benzene is run into a sodium carbonate alkaline solution containing 1.1 mol of the sodium salt of the following compound:

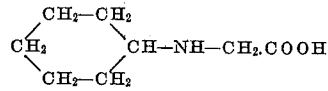

The diazoamino compound formed is separated by means of sodium chloride. It is isolated and dried.

60 grams of a mixture consisting of equivalent parts of the sodium salt of the diazoamino compound thus formed and the 1-(2',3'-hydroxynaphthoylamino)-benzene are dissolved in about 50 cc. of glycolmonoethylether or another suitable solvent and about 4 to 5 cc. of caustic soda solution of 38° Bé. in approximately 300 cc. of hot water and, after stirring into 500 grams of thickening agent, made up with water to 1000 grams. This printing paste is printed on the fiber. After drying the printed textile material is developed in neutral steam (Mather and Platt ager) for 5 minutes and thereafter soaped at the boil. A full and clear blue is obtained.

If in the diazoamino compound used above the cyclohexylamino acetic acid is replaced by sarcosine or methyl taurine, or isopropylamino acetic acid, or pyrrolidine carbonic acid (proline), similar results are obtained.

*Example 2*

By employing instead of the diazoamino compound used in Example 1 the sodium salt of the diazoamino compound prepared from 1-amino-4-benzoylamino-2-methoxy-5-methylbenzene and isopropylaminoethane sulfonic acid as stabilizer, together with 1-(2',3'-hydroxynaphthoylamino)-benzene as coupling component, adding about 4 to 6 cc. of caustic soda solution of 38° Bé. per kilogram printing color, a full and bloomy violet is obtained.

The printings on staple fiber fabric and cuprammonium silk are equal to those on cotton. By using the 1-amino-3-benzoylamino-4,6-dimethoxybenzene instead of the 1-amino-4-benzoylamino-2-methoxy-5-methylbenzene, the same effect is obtained.

*Example 3*

When replacing the sodium salt of the diazoamino compound described in Example 1 by the sodium salt of the diazoamino compound of diazotized 4-amino-4'-methoxydiphenyl amine and sarcosine as stabilizer and using 1-(2',3'-hydroxynaphthoylamino)-benzene as coupling component, adding about 4 to 6 cc. of caustic soda solution of 38° Bé. per kilogram printing color, a printing paste is obtained which yields on the fiber, after neutral steaming, a strong and fast blue.

*Example 4*

When using the diazoamino compound of Example 1 in combination with 1-(2',3'-hydroxyanthracene carboylamino)-2-methylbenzene as coupling component and about 6 to 8 cc. of caustic soda solution of 38° Bé. per kilogram printing color, a full green is obtained.

*Example 5*

When using the sodium salt of the diazoamino compound of tetrazotized 4,4'-diamino-3,3'-dimethoxydiphenyl and sarcosine as stabilizer in mixture with an equivalent quantity of 1-(2',3'-hydroxynaphthoylamino)-benzene as coupling component, a dyestuff mixture is obtained which yields, applied according to Example 1, a full and clear blue.

We claim:

1. In the process of preparing ice-colors in textile printing and dyeing towards the blue side of the spectrum from ice-color coupling components and diazo amino compounds prepared from bases which produce shades from blue to violet and selected from the group consisting of alkoxy-group-containing amino benzenes amino diphenylamines, amino diphenyls and aminobenzoylamino benzenes and secondary amine stabilizers selected from the group consisting of methylamino acetic acid, N-cyclohexylamino acetic acid, methylamino ethane sulfonic acid, and pyrrolidine carboxylic acids, the modification which comprises applying to the fiber, dyestuff compositions containing neutral fixed alkali salts of said diazoamino compounds and fixed alkali salts of ice-color coupling components and developing the dyestuff by steaming with neutral steam.

2. Process as claimed in claim 1 wherein solutions of the ice-color coupling components in about 40 to 120 percent of the quantity of fixed alkalies theoretically required for the formation of the alkali salts are used as the alkali salts of the ice-color coupling components.

References Cited in the file of this patent

UNITED STATES PATENTS

| | | |
|---|---|---|
| 1,882,561 | Haller | Oct. 11, 1932 |
| 2,675,374 | Petitcolas | Apr. 13, 1954 |

FOREIGN PATENTS

| | | |
|---|---|---|
| 859,710 | France | Sept. 16, 1940 |
| 875,276 | France | June 15, 1942 |
| 1,042,356 | France | June 3, 1953 |
| 1,056,504 | France | Oct. 21, 1953 |
| 1,067,249 | France | Jan. 27, 1954 |
| 540,978 | Great Britain | Nov. 7, 1941 |

OTHER REFERENCES

Chem. Tech. of Dyeing and Printing, by L. Diserens, transl. by Wengraf and Baumann, Reinhold Pub. Co., N. Y. C., 1948, vol. 1, pages 302–307, 320–325.